(12) United States Patent
Wang

(10) Patent No.: US 6,343,904 B1
(45) Date of Patent: Feb. 5, 2002

(54) FASTENER ASSEMBLY FOR PREVENTING COROTATION DURING TIGHTENING

(75) Inventor: Ming-Hung Wang, Tainan Hsien (TW)

(73) Assignee: Hexico Enterprise Co., Ltd., Tainan Hsien (TW)

( * ) Notice: Subject to any disclaimer, the term of this patent is extended or adjusted under 35 U.S.C. 154(b) by 0 days.

(21) Appl. No.: 09/713,180

(22) Filed: Nov. 15, 2000

(51) Int. Cl.⁷ ............................. F16B 33/00; F16B 39/24
(52) U.S. Cl. ...................... 411/368; 411/162; 411/164; 411/188
(58) Field of Search ........................... 44/160–165, 187, 44/188, 368

(56) References Cited

U.S. PATENT DOCUMENTS

| | | | |
|---|---|---|---|
| 1,882,089 A | * | 10/1932 | Olson |
| 2,271,732 A | * | 2/1942 | Chappuis |
| 2,562,032 A | * | 7/1951 | Gutenshon |
| 4,290,337 A | * | 9/1981 | Kuwata |
| 4,377,361 A | * | 3/1983 | Frieberg |

* cited by examiner

Primary Examiner—Flemming Saether
(74) Attorney, Agent, or Firm—Akin, Gump, Strauss, Hauer & Feld, L.L.P.

(57) ABSTRACT

A bolt assembly includes a bolt member, a washer, and a nut. The bolt member includes a head and a shank. The shank has a connecting section that is connected to an article confronting side of the head, an externally threaded section that extends from the connecting section, a breakable tip that extends from the externally threaded section and that is formed with a plurality of axially extending and angularly displaced teeth, and an annular groove that is formed at a juncture of the externally threaded section and the breakable tip. The washer is sleeved on the shank of the bolt member, and has an article confronting side formed with a plurality of spaced apart and radially extending anti-skid projections, and a nut confronting side opposite to the article confronting side of the washer. The nut engages threadedly the externally threaded section of the shank, and has opposing first and second surfaces respectively disposed remote from and proximate to the nut confronting side of the washer such that the second surface of the nut urges the nut confronting side of the washer toward the head of the bolt member.

2 Claims, 4 Drawing Sheets

FASTENER ASSEMBLY FOR PREVENTING COROTATION DURING TIGHTENING

BACKGROUND OF THE INVENTION

1. Field of the Invention

The invention relates to a bolt assembly, more particularly to a tension bolt assembly that can prevent co-rotation of a washer and a shank of a bolt member with a nut.

2. Description of the Related Art

In the construction of steel frameworks, to facilitate construction and ensure safety, tension bolt assemblies are generally used to couple articles.

Referring to FIGS. 1 and 2, a conventional tension bolt assembly 1 is adapted to bind first and second articles 2, 3, which are respectively formed with aligned through holes 21, 31 and opposing outer surfaces 22, 32. As shown, the bolt assembly 1 includes a bolt member 11, a washer 12, and a nut 13. The bolt member 11 includes a head 111 adapted to abut against the outer surface 32 of the second article 3, and a shank having a connecting section 112 connected to the head 111 and adapted to extend into the through holes 21, 31, an externally threaded section 113 connected to the connecting section 112, a breakable section 114 connected to the externally threaded section 113, and an annular groove 115 disposed between the externally threaded section 113 and the breakable section 114. The externally threaded section 113 is adapted to project from the outer surface 22 of the first article 2. The breakable section 114 is formed with a plurality of axially extending grooves.

When the bolt assembly 1 is used to bind the first and second articles 2, 3 together, the shank of the bolt member 11 is first extended through the aligned through holes 21, 31 in the first and second articles 2, 3, such that the head 111 abuts against the outer surface 32 of the second article 3. Then, the washer 12 is sleeved on the externally threaded section 113 that projects from the outer surface 22 of the first article 2, and the nut 13 engages threadedly the externally threaded section 113. Subsequently, a tool (not shown) is used to rotate the nut 13 so that the nut 13 urges the washer 12 to abut against the outer surface 22 of the first article 2. At this point, the bolt assembly 1 binds loosely the first and second articles 2, 3. Thereafter, a bolt tightening tool 8 specific for tension bolts and including inner and outer sleeves 81, 82 is used to engage the breakable section 114 and the nut 13, respectively. The outer sleeve 82 is rotated in one direction to drive the nut 13 until a deadlock occurs. Then, the inner sleeve 81 is rotated in a reverse direction until the breakable section 114 breaks away from the externally threaded section 113 at the annular groove 115 due to the shear produced by the differential movement of the inner and outer sleeves 81, 82. As such, the bolt assembly 1 is fully tightened and is in a highly tensed state.

Although the conventional tension bolt assembly 1 can firmly bind the first and second articles 2, 3 together, since the outer surfaces 22, 32 of the first and second articles 2, 3 are generally coated with a paint or other substance for purposes of corrosion prevention or enhancing appearance, the friction forces between the head 111 and the outer surface 22 of the first article 2 and that between the washer 12 and the outer surface 32 of the second article 3 are relatively small, thereby resulting in undesired co-rotation of the washer 12 with the nut 13, as well as rotation of the bolt member 11 with the nut 13, during the process of bolt tightening. As such, the locking force of the bolt assembly 1 cannot be controlled accurately.

SUMMARY OF THE INVENTION

Therefore, the main object of the present invention is to provide a bolt assembly that can prevent co-rotation of a washer and a bolt member with a nut during a bolt tightening operation.

Accordingly, a bolt assembly of this invention includes a bolt member, a washer, and a nut. The bolt member includes a head and a shank. The head has an article confronting side. The shank has a connecting section that is connected to the article confronting side of the head, an externally threaded section that extends from the connecting section, a breakable tip that extends from the externally threaded section and that is formed with a plurality of axially extending and angularly displaced teeth, and an annular groove that is formed at a juncture of the externally threaded section and the breakable tip. The washer is sleeved on the shank of the bolt member, and has an article confronting side and a nut confronting side opposite to the article confronting side of the washer. The article confronting side of the washer is formed with a plurality of anti-skid projections that are angularly spaced apart and that extend in radial outward directions relative to the shank of the bolt member. The nut engages threadedly the externally threaded section of the shank, and has opposing first and second surfaces respectively disposed remote from and proximate to the nut confronting side of the washer such that the second surface of the nut urges the nut confronting side of the washer toward the head of the bolt member.

BRIEF DESCRIPTION OF THE DRAWINGS

Other features and advantages of the present invention will become apparent in the following detailed description of the preferred embodiment with reference to he accompanying drawings, of which.

DETAILED DESCRIPTION OF THE PREFERRED EMBODIMENT

Figure 1:
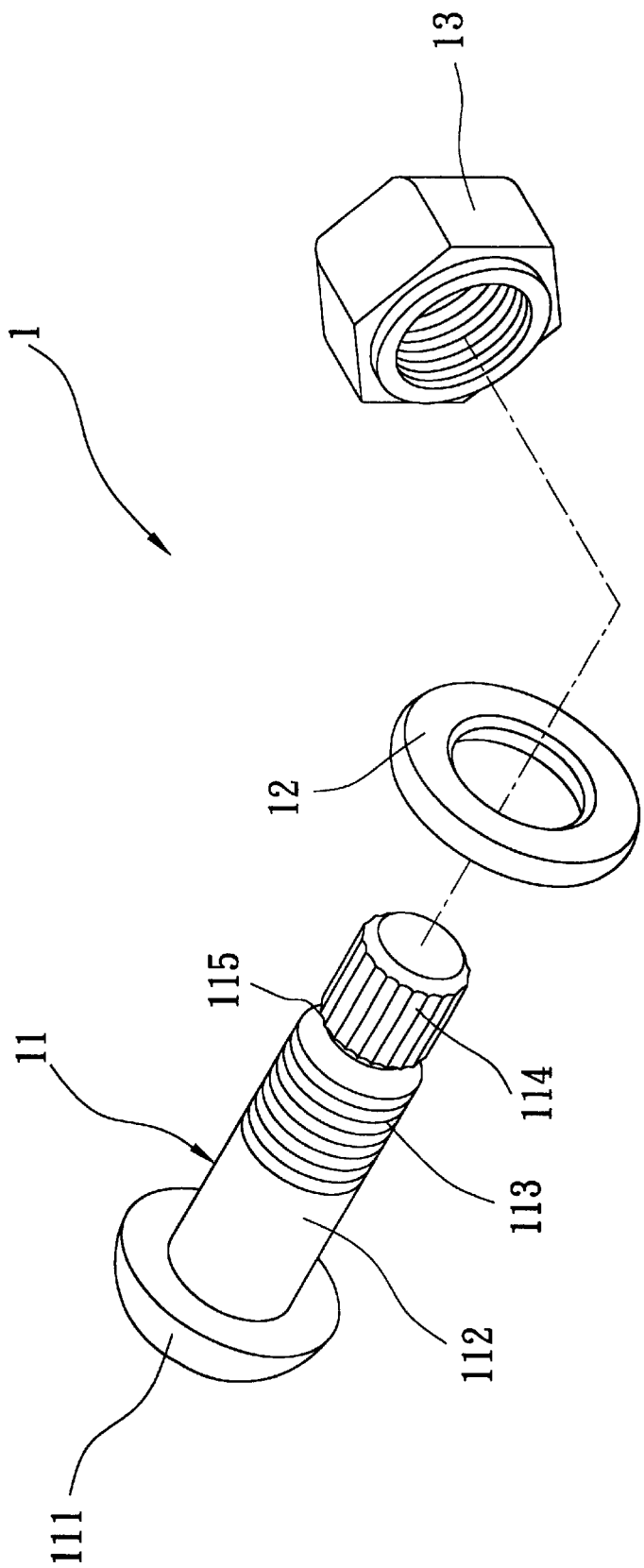
FIG. 1 is an exploded perspective view of a conventional tension bolt assembly.
Figure 2:
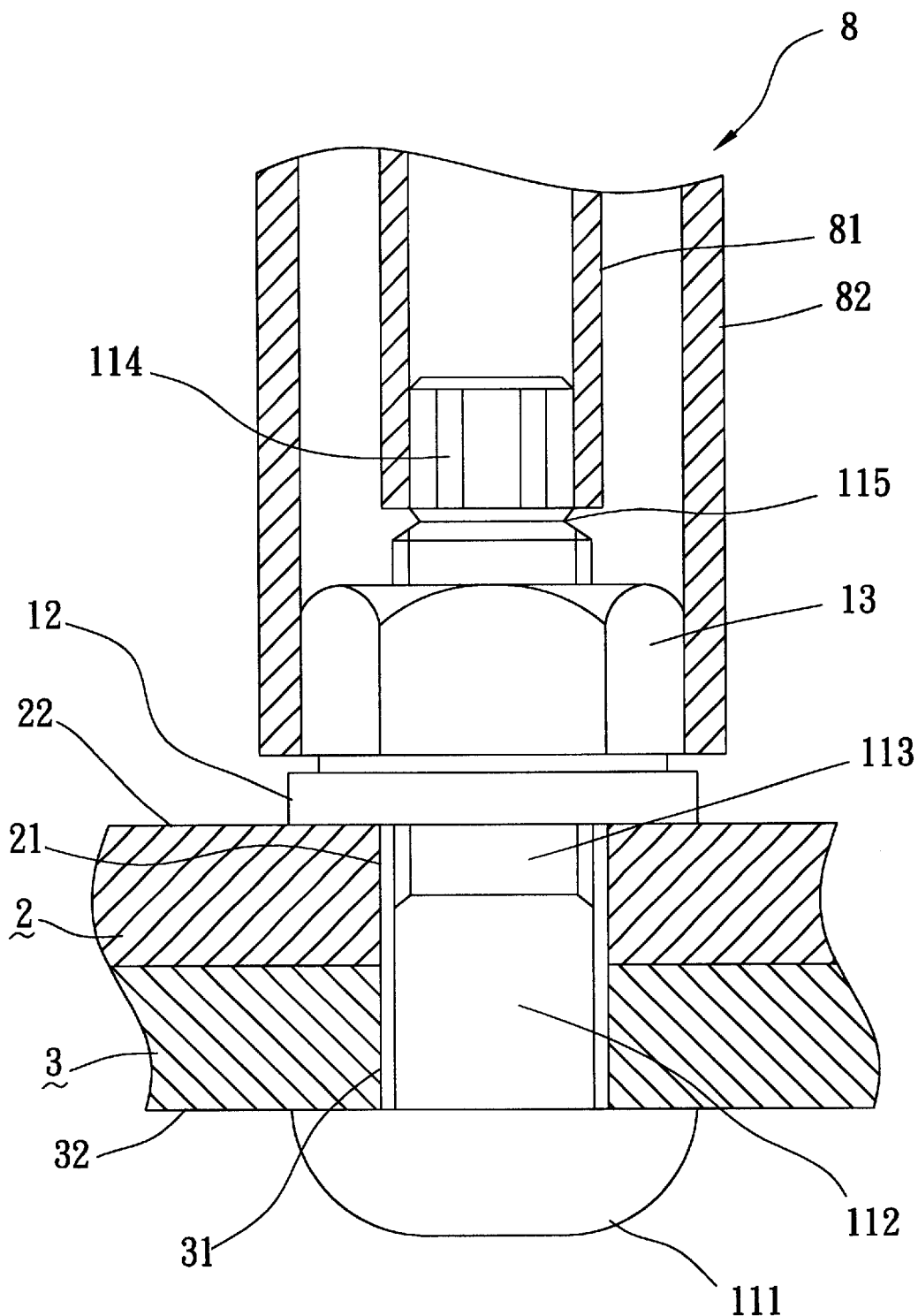
FIG. 2 is a sectional view of the conventional tension bolt assembly when used to bind two articles together.
Figure 3:
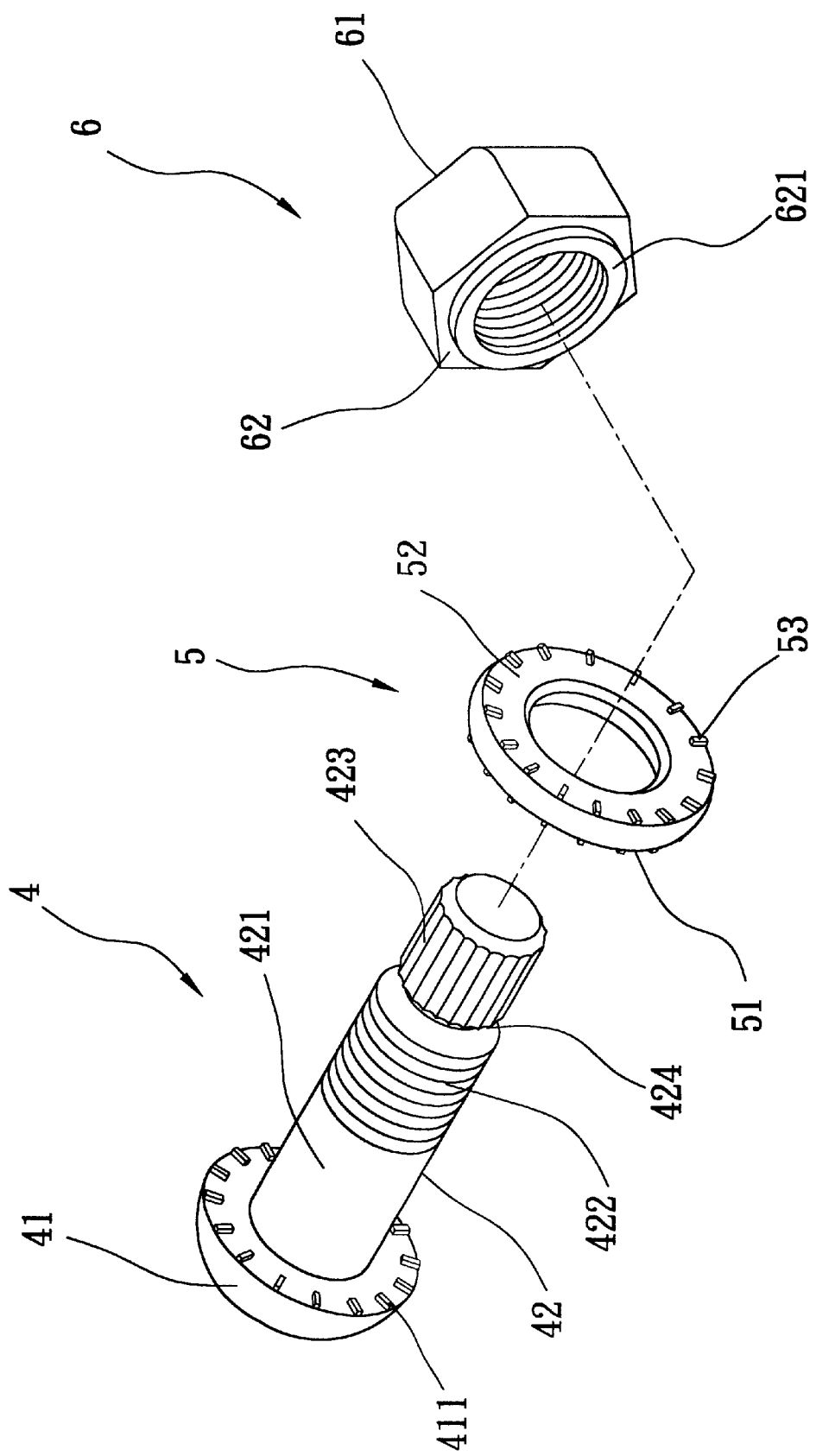
FIG. 3 is an exploded perspective view of the preferred embodiment of a bolt assembly according to the invention.
Figure 4:
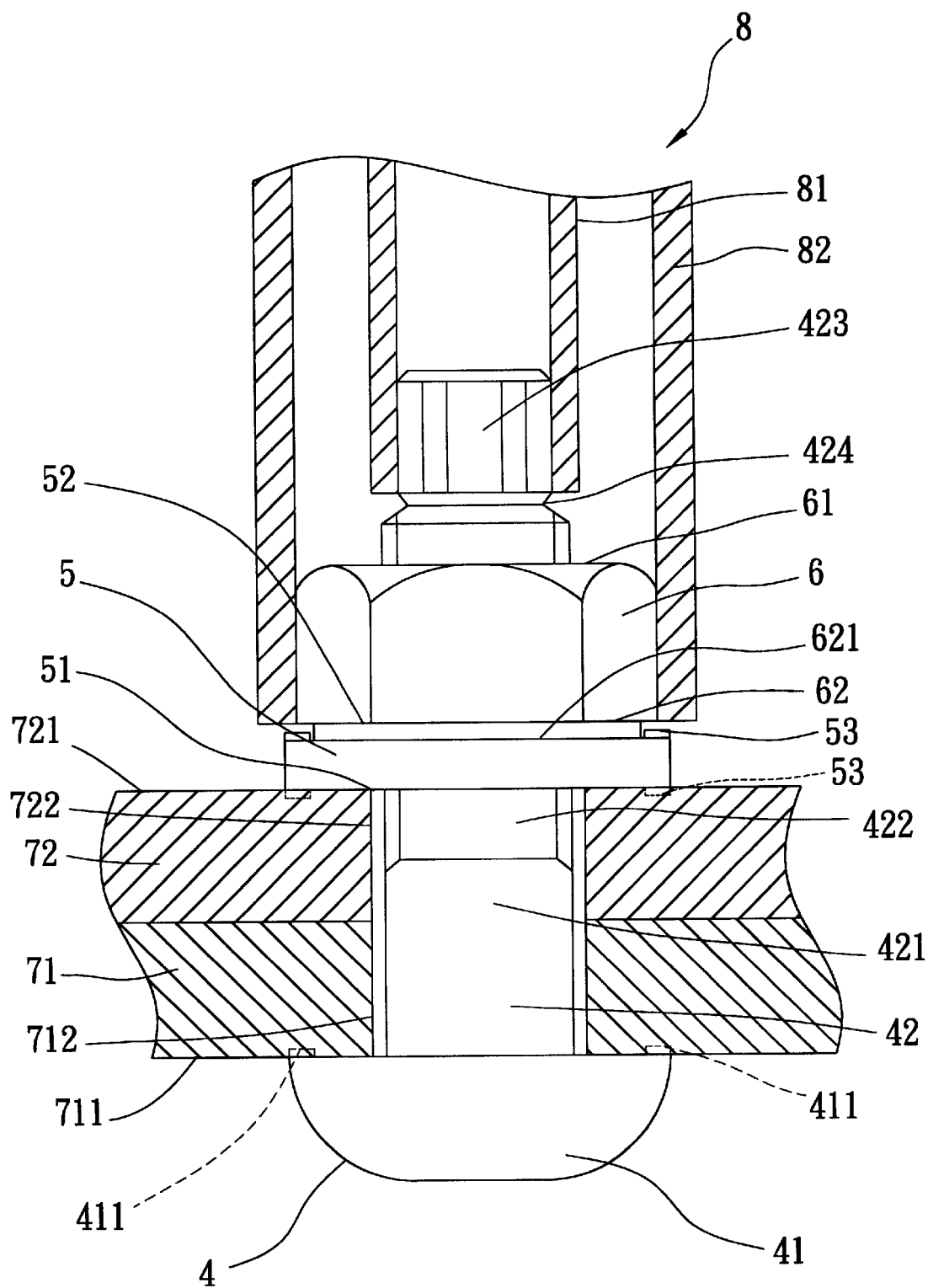
FIG. 4 is a sectional view of the preferred embodiment when used to bind two articles together.

Referring to FIGS. 3 and 4, the preferred embodiment of a bolt assembly according to the present invention is adapted to bind first and second articles 71, 72 which are respectively provided with aligned through holes 712, 722, and opposing outer surfaces 711, 721.

The bolt assembly is shown to include a bolt member 4, a washer 5, and a nut 6. The bolt member 4 includes a head 41 and a shank 42. The head 41 has an article confronting side adapted to abut against the outer surface 711 of the first article 71, and is formed with a plurality of anti-skid ribs 411 that are angularly spaced apart and that extend in radial outward directions relative to the shank 42. The shank 42 has a connecting section 421, an externally threaded section 422, a breakable tip 423, and an annular groove 424. The connecting section 421 is connected to the article confronting side of the head 41. The externally threaded section 422 extends from the connecting section 421. The breakable tip 423 extends from the externally threaded section 422, and is formed with a plurality of axially extending and angularly displaced teeth. The annular groove 424 is formed at a juncture of the externally threaded section 422 and the breakable tip 423, and has a predetermined depth. The shank 42 is adapted to extend through the aligned through holes 712, 722 such that a length of the externally threaded section 422 projects from the outer surface 721 of the second article 72.

The washer 5 is sleeved on the shank 42 of the bolt member 4, and has an article confronting side 51 and a nut confronting side 52 opposite to the article confronting side 51 of the washer 5. The article confronting side 51 of the washer 5 is adapted to abut against the outer surface 721 of the second article 72. The article confronting side 51 and the nut confronting side 52 of the washer 5 are respectively formed with a plurality of first and second anti-skid projections 53 that are angularly spaced apart and that extend in radial outward directions relative to the shank 42 of the bolt member 4.

The nut 6 engages threadedly the externally threaded section 422 of the shank 42, and has opposing first and second surfaces 61, 62 respectively disposed remote from and proximate to the nut confronting side 52 of the washer 5 such that the second surface 62 of the nut 6 urges the nut confronting side 52 of the washer 5 toward the head 41 of the bolt member 4. The second surface 62 of the nut 6 is formed with an axially extending annular ring 621 disposed around the shank 42 of the bolt member 4 and surrounded by the second anti-skid projections 53 on the nut confronting side 52 of the washer 5. As such, the annular ring 621 contacts the nut confronting side 52 of the washer 5, and prevents the second anti-skid projections 53 from interfering with rotation of the nut 6 relative to the shank 42.

When using the bolt assembly of this invention to secure the first and second articles 71, 72, the shank 42 is first extended through the aligned through holes 712, 722, and the washer 5 and the nut 6 are sleeved on the shank 42. Then, a tool (not shown) is used to cause the annular ring 621 of the nut 6 to abut against the nut confronting side 52 of the washer 5, thereby urging the first anti-skid projections 53 on the article confronting side 51 of the washer 5 to abut against the outer surface 721 of the second article 72. The bolt assembly is tightened such that the second anti-skid projections 53 are set in the outer surface 721 of the second article 72. Besides, the anti-skid ribs 411 are brought to set in the outer surface 711 of the first article 71 by rotation of the nut 6. Subsequently, a bolt tightening tool 8 adapted for use specifically with tension bolts and including inner and outer sleeves 81, 82 is employed to engage the breakable tip 423 and the nut 6, respectively. The outer sleeve 82 is rotated in one direction to drive the nut 6 to a deadlock. Then, the inner sleeve 81 is rotated in a reverse direction until the breakable tip 423 breaks away from the externally threaded section 422 at the annular groove 424, thereby tightening fully the bolt assembly against the first and second articles 71, 72.

During tightening of the bolt assembly, since the anti-skid ribs 411 and the first anti-skid projections 53 are embedded in the outer surfaces 711, 721 of the first and second articles 71, 72, respectively, the washer 5 is prevented from rotating with the nut 6, and the bolt member 4 is also prevented from rotating with the nut 6. As such, the locking force can be controlled to be within a predetermined range.

Furthermore, since the washer 5 is provided with first and second anti-skid projections 53 on both sides thereof, and since both of the first and second anti-skid projections 53 are configured to surround the annular ring 621 of the nut 6, the user need not bother with the orientation of the washer 5 during installation of the bolt assembly. Thus, working efficiency can be enhanced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bolt assembly, comprising:

a bolt member including a head with an article confronting side, and a shank with a connecting section that is connected to said article confronting side of said head, an externally threaded section that extends from said connecting section, a breakable tip that extends from said externally threaded section and that is formed with a plurality of axially extending and angularly displaced teeth, and an annular groove that is formed at a juncture of said externally threaded section and said breakable tip;

a washer sleeved on said shank of said bolt member and having an article confronting side and a nut confronting side opposite to said article confronting side of said washer, said article confronting side of said washer being formed with a plurality of first anti-skid projections that are angularly spaced apart and that extend in radial outward directions relative to said shank of said bolt member, the nut confronting side of said washer being formed with a plurality of second anti-skid projections that are angularly spaced apart and that extend in radial outward directions relative to said shank of said bolt member; and a nut that engages threadedly said externally threaded section of said shank, said nut having opposing first and second surfaces respectively disposed remote from and proximate to said nut confronting side of said washer such that said second surface of said nut urges said nut confronting side of said washer toward said head of said bolt member, the second surface of said nut being formed with an axially extending annular ring disposed around said shank of said bolt member and surrounded by said second anti-skid projections of said washer, said annular ring contacting said nut confronting side of said washer and preventing said second anti-skid projections from interfering with rotation of said nut relative to said shank.

2. The bolt assembly of claim 1, wherein said article confronting side of said head of said bolt member is formed with a plurality of anti-skid ribs that are angularly spaced apart and that extend in radial outward directions relative to said shank of said bolt member.

* * * * *